US009677785B2

(12) United States Patent
Neihouse et al.

(10) Patent No.: US 9,677,785 B2
(45) Date of Patent: Jun. 13, 2017

(54) ELECTRONIC WATER LEVEL SENSING APPARATUS AND ASSOCIATED METHODS

(71) Applicant: Rheem Manufacturing Company, Atlanta, GA (US)

(72) Inventors: Robert S. Neihouse, Fort Smith, AR (US); Shawn A. Reed, Charleston, AR (US); Walter R. Lowrimore, Alma, AR (US); Randy R. Koivisto, Fort Smith, AR (US); Scott A. Willbanks, Fort Smith, AR (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 1241 days.

(21) Appl. No.: 13/681,546

(22) Filed: Nov. 20, 2012

(65) Prior Publication Data

US 2013/0174830 A1 Jul. 11, 2013

Related U.S. Application Data

(60) Provisional application No. 61/585,306, filed on Jan. 11, 2012.

(51) Int. Cl.
*F24H 9/20* (2006.01)
*G01F 23/00* (2006.01)
*F24H 8/00* (2006.01)
*G01F 23/24* (2006.01)

(52) U.S. Cl.
CPC .......... *F24H 9/2085* (2013.01); *F24H 8/006* (2013.01); *G01F 23/0046* (2013.01); *G01F 23/241* (2013.01); *Y02B 30/106* (2013.01)

(58) Field of Classification Search
CPC .......... F25D 21/17; F24F 13/22; G01F 23/24; G01F 23/243; G01F 23/242; G01F 23/0053; G01F 23/241; G01F 23/161; H01H 29/00; F24H 8/006; F23N 5/123; F23N 5/203
USPC .......... 126/99, 3.4, 21 A, 351, 360.2, 110 R; 62/3.4, 272, 285, 150; 340/603, 620, 340/450; 73/114.55, 1.31, 304 R; 431/22; 220/562, 563, 4.12, 4.14, 4.15, 220/4.31, 4.32; 307/118; 324/251, 324/750.01

See application file for complete search history.

(56) References Cited

U.S. PATENT DOCUMENTS

| | | |
|---|---|---|
| 3,944,845 A | 3/1976 | Luteran |
| 4,019,067 A | 4/1977 | Gladstone |
| 4,638,291 A * | 1/1987 | Puscasu ............... G01F 23/242 200/190 |
| 4,761,638 A | 8/1988 | Lozano, Jr. |
| 4,937,559 A | 6/1990 | Meacham et al. |
| 5,058,421 A | 10/1991 | Alexander et al. |
| 5,522,229 A | 6/1996 | Stuchlik, III et al. |

(Continued)

*Primary Examiner* — Kenneth Rinehart
*Assistant Examiner* — Wes Anderson, Jr.
(74) *Attorney, Agent, or Firm* — King & Spalding LLP

(57) ABSTRACT

A fuel-fired condensing type air heating furnace is provided with an electronic condensate water level sensing system operative to sense improper outflow of condensate from a collector box portion of the furnace and responsively shut down or prevent operation of the furnace. Condensate probe portions of the system are oriented in a manner such that several air flow orientation of the furnace may be utilized without the necessity of relocating the probes or effecting an re-wiring of the water level sensing system.

30 Claims, 4 Drawing Sheets

(56) References Cited

U.S. PATENT DOCUMENTS

| | | | |
|---|---|---|---|
| 5,553,494 A | 9/1996 | Richards | |
| 5,719,556 A | 2/1998 | Albin et al. | |
| 5,755,105 A | 5/1998 | Lacoste | |
| 5,902,099 A * | 5/1999 | Rowlette | F23N 5/123 126/116 A |
| 6,650,128 B2 | 11/2003 | Sanders | |
| 7,036,498 B2 * | 5/2006 | Riepenhoff | F24H 8/006 126/110 R |
| 2006/0208915 A1 * | 9/2006 | Oakner | G01F 23/0053 340/620 |
| 2009/0278699 A1 * | 11/2009 | Horst | G01F 23/24 340/603 |
| 2010/0050756 A1 * | 3/2010 | Stewart | F24F 13/22 73/114.55 |

* cited by examiner

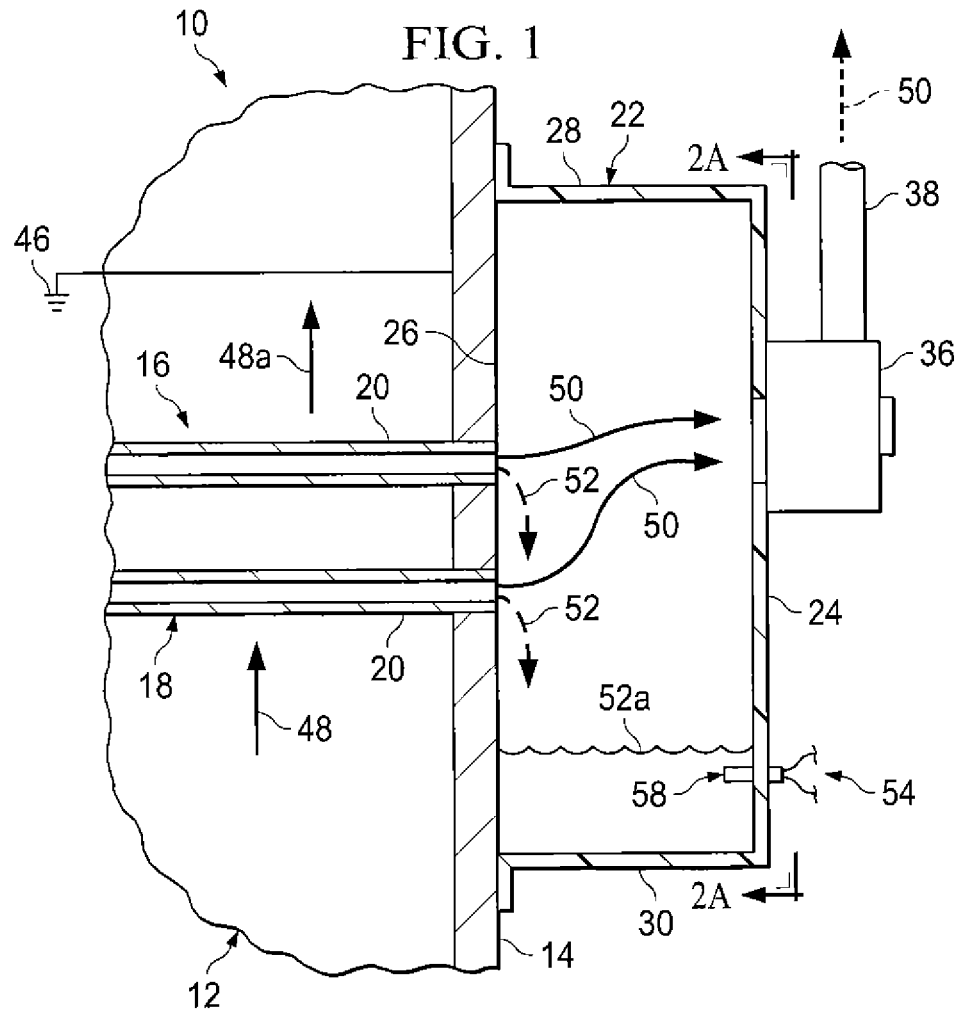
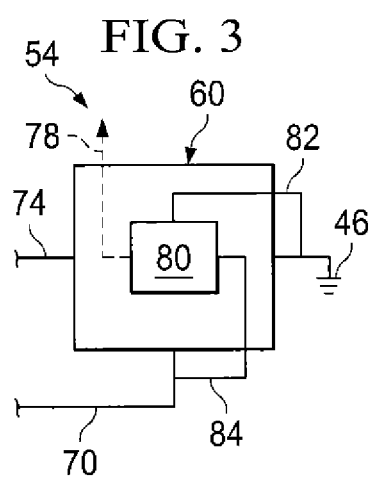
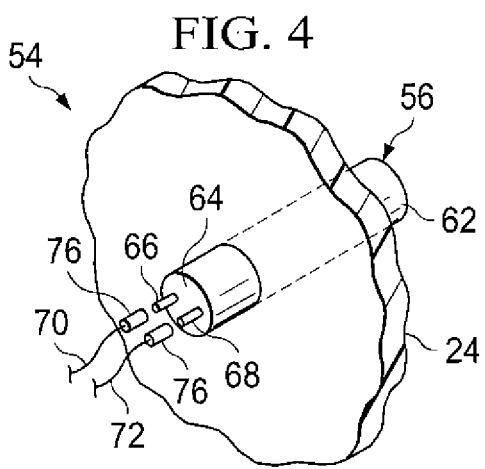

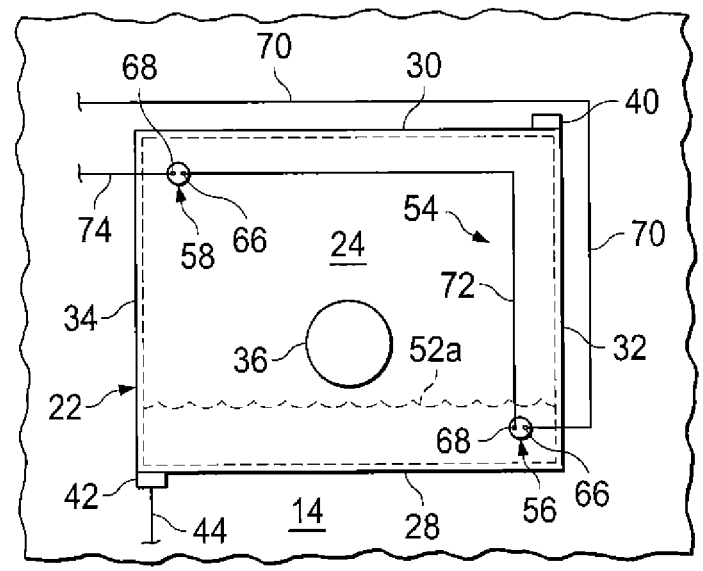
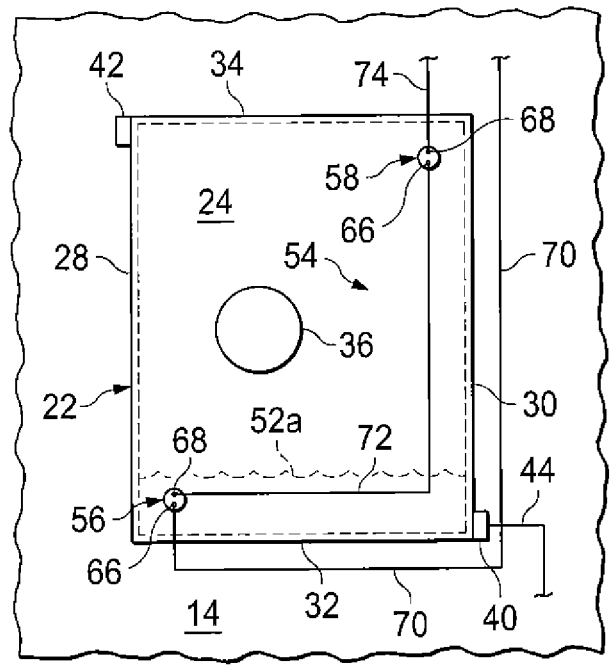

ELECTRONIC WATER LEVEL SENSING APPARATUS AND ASSOCIATED METHODS

CROSS-REFERENCE TO RELATED APPLICATION

The present application claims the benefit of the filing date of provisional U.S. patent application No. 61/585,306 filed on Jan. 11, 2012 The entire disclosure of such provisional application is hereby incorporated herein by this reference.

BACKGROUND OF THE INVENTION

The present invention generally relates to fuel-fired heating apparatus and, in a representatively illustrated embodiment thereof, more particularly relates to a specially designed electronic water level sensing apparatus illustratively operative to sense the water level in a condensate collector box portion of a fuel-fired condensing type air heating furnace.

In a conventional gas-fired condensing type air heating furnace it is necessary to detect when the condensate (water) drainage from a collector box portion of the furnace is blocked. A draft inducer fan pulls discharged heating coil combustion products out of the interior of the collector box while it receives condensate from the coil. Operation of the draft inducer fan creates within the collector box a negative pressure which is conventionally detected by a normally open pressure sensor switch through a hose interconnected between the pressure switch and a pressure tap positioned at the lowest point on the collector box. The detected negative pressure maintains the switch in a closed position and is indicative of normal draft inducer operation and condensate drainage from the collector box.

If condensate drainage from the collector box becomes blocked, the condensate level in the box rises until it covers the pressure tap location, at which point the lowered pressure within the collector box is no longer transmitted to the pressure switch which responsively returns to its normally open state. This, in turn, opens the circuit of an associated condensate water level sensing system which responsively closes the furnace's gas valve and shuts down furnace operation.

For a multi-position furnace (i.e., one that can be positioned in an upflow, downflow, horizontal left or horizontal left orientation), the furnace is basically flipped or rotated in the field from one available orientation to another available orientation. For example, to change the furnace's orientation from upflow to downflow, the furnace is simply rotated 180 degrees from its upflow orientation to its downflow orientation in which the top side of the collector box becomes its bottom side.

Various problems, limitations and disadvantages, some of which are listed below, are inherent in this conventional pressure-based detection of the condensate level in a condensing furnace condensate collector box.

1. When the furnace is configured to, for example, upflow from downflow, the pressure used to determine if a blocked collector box drain condition exists must still be detected from a lowermost portion of the collector box which is now what was previously an uppermost portion of the collector box. This necessitates an undesirable downward field repositioning of the inlet end of the pressure switch hose to a lowermost section of the collector box.

2. Such representative repositioning of the furnace from an upflow orientation to a downflow orientation now places the pressure switch (which is normally placed at a level higher that that of the anticipated maximum level of condensate in the collector box to prevent condensate from flowing down the tube into the sensor) below the anticipated condensate level in the collector box. This necessitates another undesirable field reconfiguration—namely, the upward repositioning of the pressure sensor on the re-oriented furnace.

3. Another problem with this conventional pressure-based condensate level detection system is that it takes a long time to develop fully in the laboratory before it can be implemented in production. The reason for this is that determining the pressure switch setpoint for a given furnace is tedious and time consuming and depends on the furnace input BTU's, the maximum and minimum venting specified for the furnace, the installation altitude of the furnace, and many other factors.

4. Because of all of the various factors affecting the pressure switch setpoint, each furnace in a platform of furnaces (usually only distinguished by different input BTU's), normally must have a different pressure switch setting for the blocked drain sensing. This results in the necessity of stocking and inventorying additional unwanted parts at the factory, and for replacement parts, and leads to the possibility of an installer using the wrong setting for a given furnace.

5. For high altitude applications, the pressure switch used to sense the blocked collector box drain may need to be changed, or venting lengths must be reduced to compensate for the change in air density.

6. The pressure switch is a mechanical device with moving parts. It cannot be as reliable as typical solid state components without moving components. The contacts are subject to wear and corrosion which may prevent the switch mechanism from closing the circuit. Debris can also prevent the contacts of the switch from closing. Another problem is the possibility of welded or sticking contacts in the switch.

7. Because of the relative complexity of the pressure switch (a mechanical device), the cost can be high.

8. The pressure switch is a device which detects pressure used to assume that that excess water is not present in the collector box. Because it requires that a sensor used to detect pressure is used to detect the presence of water, the sensor is once removed from the actual thing that it is trying to detect, requiring assumptions which may not be valid (e.g., no pressure sensed means no water present). A more ideal device would directly sense the thing or condition (in this case, the presence of condensate) that needs to be sensed. Because the pressure switch is once removed from the parameter it is trying to detect, the measurement of the parameter requires undesirable additional tolerances and is subjected to similarly undesirable additional failure modes. One example is that of the necessary pressure switch tubing which may be blocked unexpectedly. The blocked tubing is not indicative to water drainage blockage, but still is detected as blocked water drainage because it unnecessarily prevents operation even though there is no blockage of condensate drainage from the collector box.

9. Because the pressure switch is not integral to the collector box, and because the pressure switch is relatively large, it must usually be mounted remotely from the utilized sensing port on the collector box and connected to the port with a hose. Due to limited space availability within the furnace, it is often difficult to find enough free area/space to mount the pressure switch. A more ideal sensor would be small enough to mount directly to the port.

10. Pressure switches used for this application must have what is known as a bleed port. The bleed port is a small hole in the pressure switch which allows a tiny amount of air to pass through the pressure switch and its associated hose or tube. Without a bleed port, no air would pass through the hose. As the hose and pressure switch are exposed to the wet environment of the furnace, they would eventually become filled with water unless some air was allowed to pass through to keep them dry. This is the function of the bleed port. However, because of this bleed hole, the small amount of air allowed to pass through can allow enough negative pressure to keep the pressure switch closed even when the port on the collector box is covered with water. Once the water level in the collector box gets high enough over the port, the water pressure is too great for this small amount of air to overcome. This means that the water level must get significantly above the port on the collector box before the blocked condition is sensed. If the water level is high enough, it can get into the secondary tubes of the condensing heat exchanger, which is an undesirable condition. Because of this, the distance between the port on the collector box and the lowest tube on the heat exchanger needs to be greater than would be necessary if the water level could be detected at the port level. Since space in a furnace is a problem, this added distance requires that the furnace must be larger than necessary.

As can be readily seen from the foregoing, it would be desirable to provide a fuel-fired condensing type air heating furnace with an improved condensate water level detection system. It is to this goal that the present invention is primarily directed.

BRIEF DESCRIPTION OF THE DRAWINGS

FIG. 1 is a schematic cross-sectional view through a portion, including a condensate collector box, of a representative fuel-fired condensing type air heating furnace positioned in an upflow orientation and incorporating therein a specially designed electronic condensate water level sensing system embodying principles of the present invention;

FIG. 2C is a cross-sectional view similar to that in FIG. 2A, but with the furnace rotated to a downflow orientation;

FIG. 2D is a cross-sectional view similar to that in FIG. 2A, but with the furnace rotated to a left horizontal air flow orientation;

FIG. 3 is a schematic diagram of a specially designed control system embodying principles of the present invention and operatively linked to condensate water level sensor probe portions of the furnace;

FIG. 4 is a schematic perspective view of one of the condensate sensor probe portions of the condensate water level sensing system;

DETAILED DESCRIPTION

Figure 2A:
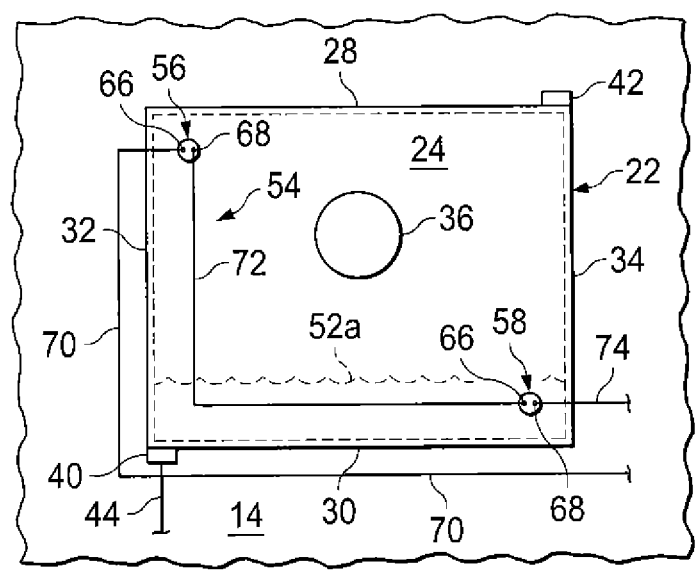
FIG. 2A is a cross-sectional view through the FIG. 1 furnace portion taken generally along line 2A-2A of FIG. 1.

In a representatively illustrated embodiment thereof the present invention provides a specially designed fuel-fired, condensing type air heating furnace 10, cross-sectional portions thereof being schematically depicted in FIGS. 1 and 2A to which reference is now made. While an air heating furnace is representatively shown, it will be readily appreciated by those of skill in this particular art that principles of the present invention are also applicable to other types of fuel-fired condensing type heating appliances, and are not limited to air heating furnaces. Similarly, principles of the present invention may be utilized to advantage in other, non-heating appliance-related liquid level sensing applications.

With continuing reference to FIGS. 1 and 2A, furnace 10 has a metal cabinet 12, with a vertical outer side wall 14, in which a heating coil 16 is operatively disposed, the heating coil 16 having a condensing section 18. Discharge tube portions 20 of the condensing section 18 extend through the cabinet wall 14 and communicate at outlet ends thereof with the interior of a condensate receptacle, representatively a collector box 22, illustratively formed from a plastic or other electrically nonconductive material and suitably secured to the outer side of the center panel or divider between the heat exchanger compartment and the combustion vestibule wall 14. Representatively, the collector box 22 has a rectangular configuration, with a front side wall 24, an open rear side 26 sealingly secured in a suitable manner to the outer side of the vertical center panel or divider between the heat exchanger compartment and the combustion vestibule wall 14, opposite top and bottom side walls 28 and 30, and (as viewed in FIG. 2A) opposite left and right end walls 32 and 34.

Figure 2B:
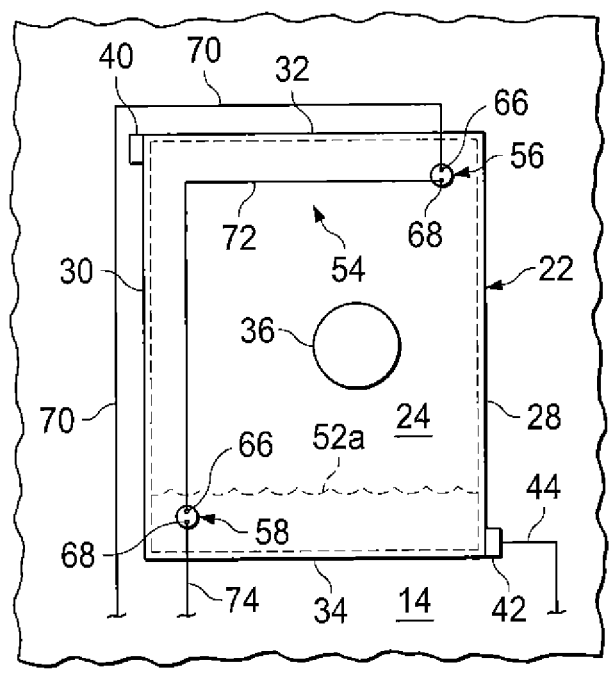
FIG. 2B is a cross-sectional view similar to that in FIG. 2A, but with the furnace rotated to a right horizontal air flow orientation.

A draft inducer fan 36 is mounted on the front collector box side wall 24 and has an inlet communicated with the interior of the collector box 22, and an outlet coupled to a suitable exhaust conduit 38. Condensate drain fittings 40,42 are respectively connected (as viewed in FIG. 2A) to diagonally opposite left bottom and right upper corner portions of the collector box 22, with a condensate drain line 44 being operatively connected to the lowermost drain fitting 40 (FIG. 2A) or 42 (FIG. 2B). For purposes later described herein, the metal cabinet 12 is electrically grounded as at 46.

As schematically depicted in FIGS. 1 and 2A, the air heating furnace 10 is in an upflow orientation such that, when operating, a supply air fan (not shown) forces return air 48 from a conditioned space served by the furnace 10 across the heating coil 16 and then upwardly discharges the air from the furnace 10 as heated supply air 48a for delivery back to the conditioned space. During operation of the furnace 10, combustion products 50 from a fuel burner (not shown) are flowed through the coil 16 to transfer heat therefrom to the air 48. Combustion products 50 discharged from the coil discharge tube portions 20 into the collector box 22 are exhausted therefrom by the draft inducer fan 36 and discharged through the exhaust conduit 38. Condensate 52 (i.e., water) in the cooled combustion products 50 entering the collector box 22 falls to the bottom of the collector box 22 and, during normal operation of the furnace 10, is drained from the collector box 22 via the drain line 44.

However, if the drain line 44 becomes clogged, condensate may collect and rise within the bottom of the collector box 22 as indicated by the reference numeral 52a in FIGS. 1 and 2A. According to a key aspect of the present invention, a specially designed electronic water level sensing system 54 is provided which is operative to sense improper outflow of condensate 52 from the collector box 22 and responsively shut down or prevent operation of the furnace 10. Associated portions of the overall system 54 are separately shown in FIGS. 1, 2A, 3 and 4 to which reference is now made.

The electronic condensate water level sensing system 54 is a part of an overall condensate collection and drainage system portion of the furnace 10 and includes first and second water level sensing probes 56 and 58 (see FIGS. 1, 2A and 4), and an associated electronic control system 60 (see FIG. 3). By way of non-limiting example, the probes 56,58 respectively extend into diametrically opposite interior top left and bottom right interior corner portions of the collector box 22 through its front side wall 24 (as viewed in FIG. 2A). Alternatively, the probes 56,58 could project into the other diametrically opposed top and bottom corner portions of the collector box 22, and/or could project through the top and bottom walls 38,30 or through the end walls 32,34.

The probes 56,58 are illustratively identical in construction, each comprising (as shown in FIG. 4 which illustrates the probe 56) a metallic body 62 having an outer end 64 from which two spaced electrical connector pins 66,68 outwardly project. As best illustrated in FIG. 2A, the pin 66 of the probe 56 is connected to an electrical lead wire 70; the pin 68 of probe 56 is connected to the pin 66 of the probe 58 by an electrical lead wire 72; and the pin 68 of probe 58 is connected to an electrical lead wire 74. Lead wire-to-probe connections are illustratively made using suitable removable connector structures such as connectors 76 shown in FIG. 4. As collectively shown by FIGS. 2A and 3, the lead wires 72,74 and 76 couple the probes 56,58 and the control system 60 in series with one another.

The control system 60, representatively an integrated furnace control (IFC), is operative as a safety measure to sense, via electrical leads 70,72 and 74, the continuity of the circuit wiring and shut down or preclude operation of the furnace 10 (representatively illustrated as a shut down signal 78) in the event that a break in such circuitry is detected. Control system 60 also includes a pre-programmed microprocessor chip 80 which is operative, via leads 82 and 84 (which are confined within the furnace control and connected on the control to leads 70 and 74), to detect the voltage potential between the probes 56,58 and ground 46. When a sufficient height of water 52*a* in the bottom of the collector box 22 at least partially submerges the lowermost probe 58, the probe 58 (through the accumulated water 52*a* created by a blockage of the drain line 44) is short circuited to ground 46. Detection of this event by the chip 80 (via the leads 82,84) results in the furnace shutdown representatively illustrated as the shutoff signal 78 being generated.

More specifically, upon furnace start-up and during furnace operation the control system 60 transmits an electrical signal outwardly through one of the electrical leads 70 and 74. If the signal is returned to the control system 60 through the other one of the leads 70 and 74 at or near full strength, circuit continuity is established and the furnace is permitted to start or continue operation as the case may be. If the signal does not return, or is substantially weakened, the control system 60 prevents furnace start-up or discontinues furnace operation. Provided that, upon testing the circuit initially (before the heating cycle) and finding the voltage above a predetermined threshold indicative of no current drain from the circuit through one of the probes 56,58 (through water 52*a* contacting the probe) to ground 46 via the metal cabinet wall 14, the control system 60 responsively inhibits furnace operation representatively illustrated as generating the shut down signal 78 which prevents furnace start-up or terminates its operation as the case may be. To prevent a temporary shorting condition (arising, for example, from water 52*a* rippling or splashing onto the lowermost probe and temporarily grounding the probe), a suitable time delay may be programmed into the control system 60 to prevent it from inhibiting the furnace (representatively illustrated as generating the shut down signal 78) unless the returning signal remains below the voltage threshold for a predetermined amount of time.

According to another aspect of the present invention, the furnace 10 may be rotated from its FIG. 2A supply air upflow orientation to its FIG. 2B horizontal right flow orientation, its FIG. 2C downflow orientation, or its FIG. 2D horizontal left orientation without the necessity of relocating either of the probes 56 and 58, or effecting any re-wiring of the water level sensing system 54. As can readily be seen by comparing FIGS. 2A-2D, regardless of which of these four air flow orientations the furnace 10 is placed in, one of the probes 56,58 is positioned at the resulting bottom side of the collector box 22 to operatively detect an unacceptably high level of condensate water 52*a* in the bottom of the collector box 22 and responsively cause the system 54 to shutdown or preclude operation of the furnace 10. As can also be seen by comparing FIGS. 2A-2D, in each of these four furnace orientations, one of the drain fittings 40,42 is conveniently positioned along the resulting bottom side of the collector box 22 for connection to a suitable drain line 44. Representatively, the height of the lowermost sensor above the lowermost collector box wall is substantially the same in all of the four illustrated rotational orientations of the furnace 10.

Figure 5:
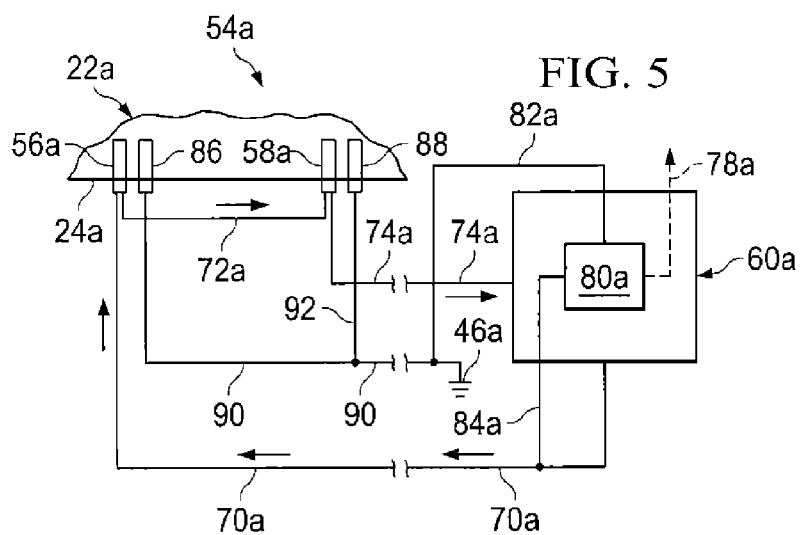
FIG. 5 is a schematic diagram of an alternate embodiment of the overall condensate water level sensing system.
Figures 6A, 6B:
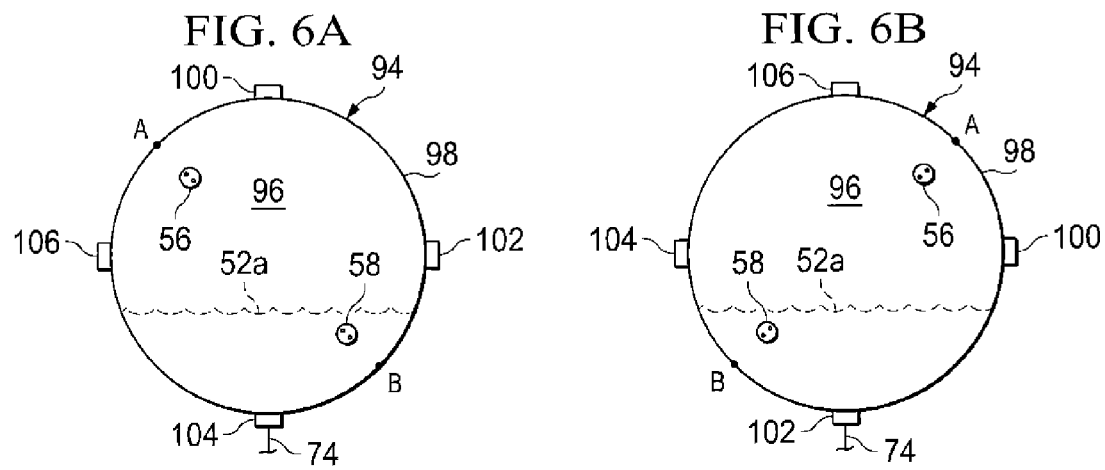
FIGS. 6A-6D illustrate the operability of the representatively illustrated condensate water level sensing systems to liquid containers having shapes different than that of the rectangular collector box schematically depicted in FIG. 2A.
Figures 6C, 6D:
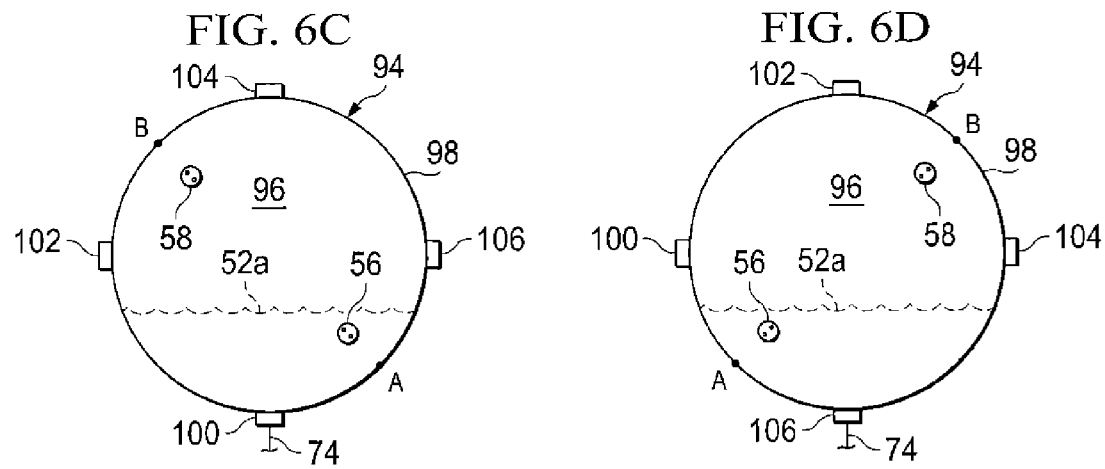

An alternate embodiment 54*a* of the previously described water level sensing system 54 is schematically depicted in FIG. 5. For ease in comparing the systems 54 and 54*a*, components in the alternate system embodiment 54*a* similar to those in the previously described system 54 have been given the same reference numerals with the subscripts "a". In the water level sensing system 54*a*, the first and second sensing probes 56*a* and 58*a* extend into the interior of the collector box 22*a* in the same locations as the previously described probes 56,58 extend into the collector box 22 (see FIG. 2A). However, the probe grounding structure utilized in the system 54*a* comprises a pair of grounding probes 86,88 extending into the interior of the collector box 22*a*. The grounding probes 86,88 are electrically coupled in parallel by the indicated electrical leads 90 and 92, with the lead 90 being connected to ground 46*a* and to the electrical lead 82*a*. When the lowermost probe 58*a* is at least partially submerged with water, it shorts out to its associated grounding probe 88 which responsively causes the control system 60*a* to generate the shut down signal 78*a*.

As previously described, the collector box 22 shown in FIGS. 1-2D is representatively of a rectangular configuration. However, without departing from principles of the present invention, the collector box may be of a variety of other shapes. By way of non-limiting example, an alternate collector box embodiment 94 is shown in FIGS. 6A-6D as having a circular configuration with a circular outer side wall 96 and a circular peripheral wall 98. Drain fittings 100,102,104,106 circumferentially spaced apart at ninety degree intervals around the peripheral wall 98, and the previously described water level sensing probes 56 and 58 extend inwardly through the housing side wall 96 and are diametrically opposed from one another, respectively being positioned at circumferential locations A and B along the peripheral wall 98. As can be seen, with the collector box 94 in each of its FIG. 6A upflow orientation, its FIG. 6B horizontal right flow orientation, its FIG. GC downflow orientation, and its FIG. 6D horizontal left orientation, one of the sensor probes 56,58 is positioned in a bottom interior portion of the collector box 98 to be contacted by condensate water 52a rising to its level.

The foregoing detailed description is to be clearly understood as being given by way of illustration and example only, the spirit and scope of the present invention being limited solely by the appended claims.

What is claimed is:

1. Heating apparatus comprising:
    a fuel-fired condensing type heating appliance which, during operation thereof, generates condensate, said heating appliance being selectively rotatable through ninety degree increments to one of a plurality of operating orientations; and
    a condensate collection and drainage system carried by said heating appliance for rotation therewith among said plurality of operating orientations, comprising:
        a receptacle for receiving condensate generated by said heating appliance,
        drainage openings formed in said receptacle and positioned thereon to form a condensate drainage outflow path from a bottom portion of said receptacle in each of its rotational orientations,
        two probes carried by said receptacle, each probe being individually capable of sensing condensate within said receptacle, and positioned at diagonally opposite ends of said receptacle in a manner such that in each of said plurality of operating orientations of said heating appliance one of said probes is disposed on the bottom portion of said receptacle, and
        a control system operable to sense condensate contact with any of said probes and responsively shut down operation or prevent start-up of said heating appliance.

2. The heating apparatus of claim 1 wherein:
    said heating appliance is a fuel-fired air heating furnace.

3. The heating apparatus of claim 2 wherein:
    said plurality of operating orientations include an upflow orientation, a horizontal right airflow orientation, a downflow orientation, and a horizontal left airflow orientation.

4. The heating apparatus of claim 1 wherein:
    said probes are formed from an electrically conductive material.

5. The heating apparatus of claim 4 wherein:
    said receptacle is formed from an electrically nonconductive material.

6. The heating apparatus of claim 5 wherein:
    said probes extend through wall portions of said receptacle into its interior.

7. The heating apparatus of claim 4 further comprising:
    an electrical grounding structure associated with said heating appliance.

8. The heating apparatus of claim 7 wherein:
    said receptacle is mounted on a metal portion of said heating appliance, and
    said metal portion defines said grounding structure.

9. The heating apparatus of claim 7 wherein:
    said control system is operative to sense a short circuit of said probes through condensate to said grounding structure and responsively shut down operation or prevent start-up of said heating appliance.

10. The heating system of claim 1 wherein:
    each of said probes is of a metal construction and has a body portion adapted to project into the interior of said receptacle, and an outer end from which a spaced pair of electrical wiring connectors outwardly project.

11. The heating apparatus of claim 1 wherein:
    said receptacle has a generally rectangular shape with first and second diagonally opposite corner portions, and
    said spaced plurality of probes comprise first and second probes respectively positioned on said first and second diagonally opposite corner portions of said receptacle.

12. The heating apparatus of claim 1 wherein:
    said control system is an electronic control system coupled to said probes with electrical wiring, and
    said heating appliance may be rotated among said plurality of operating orientations without altering said electrical wiring.

13. The heating apparatus of claim 12 wherein:
    said control system is operative to monitor the continuity of said electrical wiring.

14. The heating apparatus of claim 1 wherein:
    said probes are sensing probes, and
    said heating apparatus further comprises a plurality of grounding probes each positioned adjacent a different one of said sensing probes to form a ground structure for the adjacent sensing probe.

15. The heating apparatus of claim 14 wherein:
    said control system is an electronic control system coupled to said sensing and grounding probes with electrical wiring.

16. The heating apparatus of claim 15 wherein:
    said control system is operative to monitor the continuity of said electrical wiring.

17. The heating apparatus of claim 1 wherein:
    said heating apparatus further comprises grounding structure,
    each of said probes is operative to electrically short to said grounding structure when contacted by condensate within said receptacle, and
    said control system is operative to generate a heating appliance shut down signal after the lapse of a predetermined time period subsequent to sensing a probe electrical shorting condition.

18. Liquid level sensing apparatus comprising:
    a receptacle for receiving liquid, said receptacle being rotatable to selectively variable ones of a plurality of operating orientations;
    drainage openings formed in said receptacle and positioned thereon to form a liquid drainage outflow path from a bottom portion of said receptacle in each of its rotational orientations;
    two probes carried by said receptacle, each probe being individually capable of sensing liquid within said receptacle, and positioned at diagonally opposite ends of said receptacle in a manner such that in each of said plurality of operating orientations of said receptacle one of said probes is disposed on the bottom portion of said receptacle at a predetermined height above the lowermost wall portion of said receptacle, said predetermined height being substantially constant for all of said operating orientations of said receptacle; and
    a control system operable to sense liquid contact with any of said probes and responsively generate an output signal indicative of such contact.

19. The liquid level sensing apparatus of claim 18 wherein:
    said probes are formed from an electrically conductive material.

20. The liquid level sensing apparatus of claim 19 wherein:
    said receptacle is formed from an electrically nonconductive material.

21. The liquid level sensing apparatus of claim 20 wherein:
said probes extend through wall portions of said receptacle into its interior.

22. The liquid level sensing apparatus of claim 19 further comprising:
an electrical grounding structure.

23. The liquid level sensing apparatus of claim 22 wherein:
said control system is operative to sense a short circuit of any of said probes through liquid to said grounding structure.

24. The liquid level sensing system of claim 18 wherein:
each of said probes is of a metal construction and has a body portion adapted to project into the interior of said receptacle, and an outer end from which a spaced pair of electrical wiring connectors outwardly project.

25. The liquid level sensing apparatus of claim 18 wherein:
said receptacle has a generally rectangular shape with first and second diagonally opposite corner portions, and
said spaced plurality of probes comprise first and second probes respectively positioned on said first and second diagonally opposite corner portions of said receptacle.

26. The liquid level sensing apparatus of claim 18 wherein:
said control system is an electronic control system coupled to said probes with electrical wiring, and
said receptacle may be rotated among said plurality of operating orientations without altering said electrical wiring.

27. The liquid level sensing apparatus of claim 26 wherein:
said control system is operative to monitor the continuity of said electrical wiring.

28. The liquid level sensing apparatus of claim 18 wherein:
said probes are sensing probes, and
said control system further comprises a plurality of grounding probes positioned to form grounding structures for associated ones of said sensing probes.

29. The liquid level sensing apparatus of claim 28 wherein:
said control system is an electronic control system coupled to said sensing and grounding probes with electrical wiring.

30. The liquid level sensing apparatus of claim 29 wherein:
said control system is operative to monitor the continuity of said electrical wiring.

\* \* \* \* \*